(12) United States Patent
Flitcroft et al.

(10) Patent No.: US 7,895,122 B2
(45) Date of Patent: Feb. 22, 2011

(54) PERSON-TO-PERSON, PERSON-TO BUSINESS AND BUSINESS-TO-BUSINESS FINANCIAL TRANSACTION SYSTEM

(75) Inventors: Daniel I. Flitcroft, Dublin (IE); Graham O'Donnell, Dublin (IE)

(73) Assignee: Orbis Patents Limited, Blackrock (IE)

( * ) Notice: Subject to any disclaimer, the term of this patent is extended or adjusted under 35 U.S.C. 154(b) by 0 days.

(21) Appl. No.: 12/222,958

(22) Filed: Aug. 20, 2008

(65) Prior Publication Data

US 2009/0012897 A1    Jan. 8, 2009

Related U.S. Application Data

(63) Continuation of application No. 09/548,659, filed on Apr. 13, 2000, now Pat. No. 7,433,845.

(60) Provisional application No. 60/129,033, filed on Apr. 13, 1999.

(51) Int. Cl.
*G06Q 40/00* (2006.01)
(52) U.S. Cl. .......................... 705/44; 705/30
(58) Field of Classification Search .............. 705/10–44
See application file for complete search history.

(56) References Cited

U.S. PATENT DOCUMENTS

| | | |
|---|---|---|
| 3,938,091 A | 2/1976 | Atalla et al. |
| 4,423,316 A | 12/1983 | Sano et al. |
| 4,707,592 A | 11/1987 | Ware |
| 4,720,860 A | 1/1988 | Weiss |
| 4,725,719 A | 2/1988 | Oncken et al. |
| 4,747,050 A | 5/1988 | Brachtl et al. |
| 4,797,920 A | 1/1989 | Stein |
| 4,856,062 A | 8/1989 | Weiss |
| 4,874,932 A | 10/1989 | Kimizu |
| 4,893,330 A | 1/1990 | Franco |
| 4,941,090 A | 7/1990 | McCarthy |
| 4,988,849 A | 1/1991 | Sasaki et al. |
| 4,998,279 A | 3/1991 | Weiss |
| 5,023,904 A | 6/1991 | Kaplan et al. |
| 5,093,861 A | 3/1992 | Graham |

(Continued)

FOREIGN PATENT DOCUMENTS

EP    0 081 921    6/1983

(Continued)

OTHER PUBLICATIONS

Flitcroft et al., Copending U.S. Appl. No. 09/691,175, filed Oct. 19, 2000.

(Continued)

*Primary Examiner*—Frantzy Poinvil
(74) *Attorney, Agent, or Firm*—Buchanan Ingersoll & Rooney PC

(57) ABSTRACT

The delivery of a secure method and system of generating person to person, business to business, business to person and person to business transactions involving transfer of funds from one party (the purchaser) to a second party (the vendor). The functionality of existing credit/debit cards and the associated infrastructure is extended to provide a secure global mechanism for individuals/businesses to receive funds without revealing confidential information or having to become credit/debit accepting merchants.

32 Claims, 3 Drawing Sheets

U.S. PATENT DOCUMENTS

| | | | |
|---|---|---|---|
| 5,097,505 A | 3/1992 | Weiss |
| 5,117,355 A | 5/1992 | McCarthy |
| 5,130,519 A | 7/1992 | Bush et al. |
| 5,163,097 A | 11/1992 | Pegg |
| 5,193,114 A | 3/1993 | Moseley |
| 5,196,840 A | 3/1993 | Leith et al. |
| 5,202,826 A | 4/1993 | McCarthy |
| 5,231,570 A | 7/1993 | Lee |
| 5,239,583 A | 8/1993 | Parrillo |
| 5,287,268 A | 2/1994 | McCarthy |
| 5,317,636 A | 5/1994 | Vizcaino |
| 5,323,338 A | 6/1994 | Hawthorne |
| 5,326,960 A | 7/1994 | Tannenbaum |
| 5,343,529 A | 8/1994 | Goldfine et al. |
| 5,350,906 A | 9/1994 | Brody et al. |
| 5,363,449 A | 11/1994 | Bestock |
| 5,428,684 A | 6/1995 | Akiyama et al. |
| 5,466,919 A | 11/1995 | Hovakimian |
| 5,478,994 A | 12/1995 | Rahman et al. |
| 5,479,494 A | 12/1995 | Clitherow |
| 5,485,510 A | 1/1996 | Colbert |
| 5,500,513 A | 3/1996 | Langhans et al. |
| 5,504,808 A | 4/1996 | Hamrick, Jr. |
| 5,555,497 A | 9/1996 | Helbling |
| 5,577,109 A | 11/1996 | Stimson et al. |
| 5,583,918 A | 12/1996 | Nakagawa |
| 5,592,553 A | 1/1997 | Guski et al. |
| 5,606,614 A | 2/1997 | Brady et al. |
| 5,621,201 A | 4/1997 | Langhans et al. |
| 5,627,355 A | 5/1997 | Rahman et al. |
| 5,671,279 A | 9/1997 | Elgamal |
| 5,677,955 A | 10/1997 | Doggett et al. |
| 5,694,471 A | 12/1997 | Chen et al. |
| 5,696,908 A | 12/1997 | Muehlberger et al. |
| 5,715,314 A | 2/1998 | Payne et al. |
| 5,721,768 A | 2/1998 | Stimson et al. |
| 5,724,424 A | 3/1998 | Gifford |
| 5,748,908 A | 5/1998 | Yu |
| 5,757,917 A | 5/1998 | Rose et al. |
| 5,768,381 A | 6/1998 | Hawthorne |
| 5,777,305 A | 7/1998 | Smith et al. |
| 5,777,306 A | 7/1998 | Masuda |
| 5,825,881 A | 10/1998 | Colvin, Sr. |
| 5,826,241 A | 10/1998 | Stein et al. |
| 5,826,243 A | 10/1998 | Musmanno et al. |
| 5,832,087 A | 11/1998 | Hawthorne |
| 5,864,830 A | 1/1999 | Armetta et al. |
| RE36,116 E | 2/1999 | McCarthy |
| 5,868,236 A | 2/1999 | Rademacher |
| 5,878,141 A | 3/1999 | Daly et al. |
| 5,883,810 A | 3/1999 | Franklin et al. |
| 5,884,271 A | 3/1999 | Pitroda |
| 5,890,137 A | 3/1999 | Korceda |
| 5,893,907 A | 4/1999 | Ukada |
| 5,903,830 A | 5/1999 | Joao et al. |
| 5,903,878 A * | 5/1999 | Talati et al. ............. 705/26 |
| 5,949,044 A | 9/1999 | Walker et al. |
| 5,953,710 A | 9/1999 | Fleming |
| 5,956,699 A | 9/1999 | Wong et al. |
| 5,963,925 A | 10/1999 | Kolling et al. |
| 5,984,180 A | 11/1999 | Albrecht |
| 5,987,118 A | 11/1999 | Dickerman et al. |
| 5,991,750 A | 11/1999 | Watson |
| 6,000,832 A | 12/1999 | Franklin et al. |
| 6,012,048 A | 1/2000 | Gustin et al. |
| 6,029,890 A | 2/2000 | Austin |
| 6,032,133 A | 2/2000 | Hilt et al. |
| 6,144,948 A | 11/2000 | Walker et al. |
| 6,163,771 A | 12/2000 | Walker et al. |
| 6,185,545 B1 | 2/2001 | Resnick et al. |
| 6,188,761 B1 | 2/2001 | Dickerman et al. |
| 6,193,155 B1 | 2/2001 | Walker et al. |
| 6,227,447 B1 | 5/2001 | Campisano |
| 6,240,397 B1 | 5/2001 | Sachs |
| 6,267,292 B1 | 7/2001 | Walker et al. |
| 6,298,335 B1 | 10/2001 | Bernstein |
| 6,324,526 B1 | 11/2001 | D'Agostino |
| 6,339,766 B1 | 1/2002 | Gephart |
| 6,341,724 B2 | 1/2002 | Campisano |
| 6,343,279 B1 | 1/2002 | Bissonette et al. |
| 6,352,205 B1 | 3/2002 | Mullins et al. |
| 6,375,084 B1 | 4/2002 | Stanford et al. |
| 6,380,959 B1 | 4/2002 | Wang et al. |
| 6,393,411 B1 | 5/2002 | Bishop et al. |
| 6,408,284 B1 | 6/2002 | Hilt et al. |
| 6,422,462 B1 | 7/2002 | Cohen |
| 6,598,031 B1 | 7/2003 | Ice |
| 6,636,833 B1 | 10/2003 | Flitcroft et al. |
| 6,826,542 B1 | 11/2004 | Virgin et al. |
| 6,885,857 B1 | 4/2005 | Henson |
| 6,901,387 B2 | 5/2005 | Wells et al. |
| 7,136,835 B1 | 11/2006 | Flitcroft et al. |
| 7,181,432 B2 | 2/2007 | Wells et al. |
| 7,319,986 B2 | 1/2008 | Praisner et al. |
| 7,389,275 B2 | 6/2008 | Kemper et al. |
| 7,427,021 B2 | 9/2008 | Kemper et al. |
| 7,433,845 B1 | 10/2008 | Flitcroft et al. |
| 7,567,934 B2 | 7/2009 | Flitcroft et al. |
| 7,571,142 B1 | 8/2009 | Flitcroft et al. |
| 2002/0099642 A1 | 7/2002 | Schwankl et al. |
| 2002/0099649 A1 | 7/2002 | Lee et al. |
| 2002/0120587 A1 | 8/2002 | D'Agostino |
| 2002/0160771 A1 | 10/2002 | Massie et al. |
| 2003/0018567 A1 | 1/2003 | Flitcroft et al. |
| 2003/0097331 A1 | 5/2003 | Cohen |
| 2003/0110136 A1 | 6/2003 | Wells et al. |
| 2003/0216997 A1 | 11/2003 | Cohen |
| 2003/0233334 A1 | 12/2003 | Smith |
| 2004/0068469 A1 | 4/2004 | Atig |
| 2004/0128243 A1 | 7/2004 | Kavanagh et al. |
| 2005/0086169 A1 | 4/2005 | Wells et al. |
| 2006/0031161 A1 | 2/2006 | D'Agostino |
| 2007/0198411 A1 | 8/2007 | Kavanagh et al. |
| 2008/0120238 A1 | 5/2008 | Flitcroft et al. |
| 2009/0037333 A1 | 2/2009 | Flitcroft et al. |
| 2009/0070260 A1 | 3/2009 | Flitcroft et al. |
| 2009/0134217 A1 | 5/2009 | Flitcroft et al. |

FOREIGN PATENT DOCUMENTS

| | | |
|---|---|---|
| EP | 0 590 861 A2 | 4/1994 |
| EP | 0 590 961 A2 | 4/1994 |
| EP | 0 745 961 | 5/1996 |
| EP | 1 821 249 A1 | 7/2006 |
| FR | 2 661 996 | 11/1991 |
| GB | 2 145 265 A | 3/1985 |
| GB | 2 252 270 A | 8/1992 |
| GB | 2 327 831 A | 2/1997 |
| GB | 2 305 393 | 4/1997 |
| GB | 2 361 790 A | 10/2001 |
| JP | 6-282556 | 10/1994 |
| WO | WO 91/12680 A1 | 8/1991 |
| WO | WO 91/12693 A1 | 8/1991 |
| WO | WO 93/14476 A1 | 7/1993 |
| WO | WO 95/07512 A1 | 3/1995 |
| WO | WO 96/08756 A1 | 3/1996 |
| WO | WO 96/42150 A2 | 12/1996 |
| WO | WO 97/15893 A1 | 5/1997 |
| WO | WO 97/19549 A1 | 5/1997 |
| WO | WO 98/26376 A2 | 6/1998 |
| WO | WO 98/30985 A3 | 7/1998 |
| WO | WO 99/49424 A1 | 9/1999 |
| WO | WO 00/49586 A1 | 8/2000 |
| WO | WO 03/001866 A1 | 1/2003 |

| | | |
|---|---|---|
| WO | WO 03/050741 A2 | 6/2003 |
| WO | WO 2004/086171 A2 | 10/2004 |
| WO | WO 2004/086171 A3 | 10/2004 |

OTHER PUBLICATIONS

Flitcroft et al., Copending U.S. Appl. No. 10/160,190, filed Jun. 4, 2002.
Flitcroft et al., Copending U.S. Appl. No. 12/219,952, filed Jul. 30, 2008.
Flitcroft et al., Copending U.S. Appl. No. 12/010,082, filed Jan. 18, 2008.
Flitcroft et al., Copending U.S. Appl. No. 12/268,063, filed Nov. 10, 2008.
Flitcroft et al., Copending U.S. Appl. No. 12/359,971, filed Jan. 26, 2009.
Owen Thomas, Money Changers; Moolah; Online Cash; www.ecompany.com, Oct. 2000.
GE Capital Financial, Inc., "GE Pre-Authorization System," www.ge.com/capital/cardservices/corpcard/3pccard4.htm.
Kelchpel et al., "Shopping Models: A Flexible Architecture for Information Commerce," Library Project Working Paper SIDL-WP-19960052, 1996.
Morrall "Where the Card is King," Credit Card Management, p. 12, Sep. 1992.
Web page for "Virtual Credit Card (VCC)" found at: http://www.geocities.com/Eureka/Park/5014/vcc.htm bearing the parent, putative date of Aug. 9, 1998.
Durbin, "ASTA Unit: No Active Status for SATO," Travel Weekly, Jan. 26, 1987, vol. 45, p. 92.
Jones, "ACE Server to Ship for NT," InfoWorld, Feb. 3, 1997, vol. 19, No. 5, p. 8.
Yamada, "Security Dynamics Plans to Launch Reseller Program," Computer Reseller News, Aug. 19, 1996, No. 697, p. 65.
Davis, "Vendors Put New Spin on Security Wares," Communications Week, Mar. 27, 1995, No. 549, p. 5.
"Security Dynamics & Cisco Offer 'Crackerproof' Routers," Newsbytes News Network, Jun. 20, 1994.
Highland, "With Tokens, It's a New Password Every Time," Computerworld, Jun. 11, 1990, vol. 24, No. 24, pp. 88-89.
"Security Dynamics Announces ACE/Client for NT/RAS," Business Wire, Mar. 27, 1995.
"Security Dynamics Expands Level of User Authentication for Internet Security," Business Wire, Mar. 27, 1995.
"Enigma Logic: Enigma Logic Introduces SafeWord SofToken," Business Editors & Computer Writers Jun. 1, 1994.
Brown, "TGV Launches Token-Based Security Ware," Communications Weeks, Oct. 31, 1994, No. 529, p. 4.
"CRYPTOCard 2: CRYPTOCard Enables Companies and ISPs to Secure Intranet Access with Authentication Tokens at Much Lower Costs," Business Wire, Jun. 29, 1998.
Lamond, Credit Card Transaction Real World and Online, 1996, http://www.virtualschool.edu/mon/electronicproperty/clamond/creditcard.htm.
Wiggins, "Putting Risk in Perspective," http://www.webreference.com/outlook/column3/page4.html, 1997.
Crotch-Harvey, Electronic Money and the Law—The Implications, http://www.smartcard.co.uk/articles/electronicmoney.html.
B. Ives & M. Earl, Mondex International: Reengineering Money, http://isds.bus.isu.edu/cases/mondex.html, 1997.
V. Moscaritolo, Digital Commerce for the Rest of US Apple in a Geodesic Economy, http://www.shipwright.com/rants/rant_15.html, Sep. 4, 1996.
Herscheim, "Smart Card," http://disc.cba.uh.edu/~rhirsch/fa1196/neepa.htm, Sep. 24, 1996.
Agora: "A minimal Distributed Protocol of Electronic Commerce," USENIX Workshop on Electronic Commerce, http://www.usenix.org/publications/library/proceedings/ec96/full_papers/grabber/html/ held from Nov. 18-21, 1996.
GE Capitol Financial, Inc., "Corporate E-Card and E-Commerce Glossary," http://www.ge.com/capital/cardservices/corpcard/5news5.html.
"NetChex—a short brief," http://www.tml.hut.fi/Studies/Tik-110.350/1997/Ecommerce/netchex_5.html, 1997.
NetChex: "Announcement: Jan 11, 1995 NetChex offers Secure Checking to the Web," http://ntrg.cs.tcd.ie/mepeirce/Project/Press/netchex.html, Jan. 1995.
Visa, third parties add technology to protect shoppers and merchants Anonymous. Credit Card News. Chicago: Nov 15, 2000. p. 1, 2.
Clayton, Michelle, "The case for debit cards," America's Community Banker, v 7, n 3, p. 22-27, Mar 1998.
After Mexican Operations Work, Total Systems Moves Into Canada. Card News. Potomac: Feb 16, 1998. vol. 13, Iss. 3; p. 1.
Defuse the debit-card bomb Banks and credit card companies OK caps on consumer liability, but the limits should be enforced by new federal law, too; [Second Edition] San Francisco Examiner. San Francisco, Calif.: Aug 18, 1997. p. A.14.

* cited by examiner

Fig. 2

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|----|----|----|----|----|----|----|----|
| 201 | | | | | | 202 | | | | | | | | | | 203 |

PERSON-TO-PERSON, PERSON-TO BUSINESS AND BUSINESS-TO-BUSINESS FINANCIAL TRANSACTION SYSTEM

This is a continuation of U.S. application Ser. No. 09/548,659, filed on Apr. 13, 2000, and now U.S. Pat. No. 7,433,845. This application claims benefit to U.S. Provisional Application No. 60/129,033, filed on Apr. 13, 1999, herein incorporated by reference.

BACKGROUND OF THE INVENTION

1) Field of the Invention

The present invention relates to financial data processing and business practices regarding funds transfer. More specifically, the present invention provides a personal payment number (PPN) wherein an individual or business can receive payments from other individuals or businesses without revealing confidential account information or establishing themselves as a credit/debit card accepting merchant.

2) Brief Description of Related Art

With the increasing globalization of commerce the need for safe and secure ways to make payments between individuals, businesses and merchants now extends to systems that provide global coverage and include currency exchange systems. In addition there is a need for these systems to be secure and also to be trusted by all parties.

Existing systems such as systems based on bank checks or bank transfers involve either the payer or the payee revealing details about their bank account to at least the other party. For instance, the recipient of a check sees the payer's bank account and routing information on the check, and with a bank transfer the recipient/payee must provide their account information to the sender/payer. In a global situation where the two parties may have never have met, sharing of such information may be sufficient cause for concern to deter one or other party from proceeding. Also, different checking and bank transfer systems can reduce the effectiveness of the financial transaction.

The global credit/debit card system provides an ideal mechanism for receiving payment but under normal circumstances requires the recipient to be a credit card accepting merchant. Being a credit card accepting merchant may not be cost-effective for some people or businesses wanting receiving payments. Also smaller merchants without a good trading history may have difficulty in being accepted by credit card acquiring banks as credit card accepting merchants.

The ability to receive funds using a simple, rapid and secure system without the need to be a formal credit card accepting merchant will be of benefit to a wide range of users. For example the rise of online auction services (such as those developed by eBay and Amazon) means that many individuals may occasionally require a means of receiving finds remotely, such as over the Internet. Also, the widespread "shareware" software distribution system provides a mechanism for software written by individuals to be distributed on a global basis. Shareware authors are generally individuals that do not have the organizational support to handle global payments. Therefore a system that can provide a global payment solution with no administrative overheads with automatic currency conversion would be very attractive to these as well as many other users.

In the growing global electronic commerce environment many individuals and companies may offer their service remotely over the Internet or other public, semipublic or closed network. Such services (programming, translation, writing, clerical, accounting, web-page design, etc) will typically be provided remotely and not require any direct physical interaction between the provider of the service and the service user. The two parties to such an arrangement may never have met raising the issue of mutual trust. In addition they may be in different countries and this produces problems for currency exchange or incompatibility of bank transfer systems as well legal challenges if a non-payment dispute arises. Again a simple, rapid global payment solution would be of benefit.

The need and value of such a service is indicated by the number of systems that have already been proposed to address this issue. Examples of systems operating within this area include:

Billpoint This service acts as an intermediary between payers and payees, requiring both to sign up to the system. It is operated as proprietary system and is designed for application in the on-line auction house arena.

PayPal This system is another intermediary closed system where the payer registers with PayPal and provides credit card or bank account details. When the payer wants to make a payment he transfers money to PayPal and an email is sent to the email address of the recipient with message that someone has sent you money. The recipient must then register to receive the funds by account transfer or refunded onto a conventional credit card number.

Payme This system sends email bill to users through the Payme site (payee registers with "Payme"), email goes out with a request for payment. The payer pays Payme who transfers the funds to payee.

eMoneyMail In this system the payee goes the eMoney website and pays with credit/debit/account transfer and gives the email address of the recipient. The recipient receives an email with a link back to the eMoney site where they can receive the funds by transfer to a checking account or credit card.

Wire-transfer The provider offers a range of services offer account to account wire transfer such as Western Union and Swift.

Checkfree This system is an example of a bill paying system which requires both parties to be registered with the system.

In many of the above systems the recipient must give either a credit/debit card number or bank account number to a third party (payer or other intermediary). In the case of using a credit/debit card, the payment is made by initiating a "refund" transaction even though there was no matching initial payment since the payment was made another party. There are two key problems with using this refund mechanism:

(1) Within the current card systems (such as Visa, Mastercard and Europay) there is the problem of reverse interchange. This is the process whereby a refund leads to the customer's bank (i.e., the bank who issued the credit card that is being refunded) paying back to the merchant acquiring bank (i.e., the bank that received the refund request from a credit card merchant) the interchange fee (effectively a commission) that would have been kept by the customers bank on the original payment. Since no original payment has been made in the scenario where someone is receiving money from a third party, the customer's bank (i.e., the bank who issued the credit card that is being refunded) is effectively being charged for the transaction at a cost of approximately 1.5% of its value depending on the prevailing interchange rates for the specific credit card. Under the current credit card systems, trying to change the rules for refunds to address this issue will lead to the converse problems in true refunds.

(2) In order to receive funds a user must reveal his or her actual credit card number. These details have the potential to be misused creating worry, inconvenience and potentially financial cost for the recipient. In the case of Internet payment systems, this information is then potentially stored on a server connected to the Internet. As recent fraud scares have indicated, storage of personal details in computer databases linked to the Internet represents possibly the most vulnerable security weakness with Internet based credit card transactions.

In addition, with several of above the above Internet payment services, the recipient receives an email notifying them that someone wishes to pay funds to them. The recipient then follows a link in the email to a site where he/she must enter their credit or bank account details to receive the funds. Clearly a fraudulent message offering a prize, a non-existent payment, etc., could easily lead to innocent victims giving over their credit card details which could then be misused by the perpetrator of the fraud.

SUMMARY OF THE INVENTION

These and other problems are solved by the present invention which represents a new form of credit/debit card with an associated account number that is limited so as to prevent it being used for any purchases—but instead is expressly designed for the purpose of receiving funds. In other words, the present invention involves a personal payment number (PPN) format including routing information (e.g., a BIN) to direct financial transaction information to a particular institution among a plurality of institutions on a computer network, and a unique identification of a user associated with the particular institution. The PPN format can also include an identifier identifying the personal payment number as an account to which funds can be transferred but from which funds cannot be transferred. The PPN format can follow a standard credit/debit card format, or can be unique among but follow standard credit/debit card formats or be distinct from standard credit/debit card formats. The PPN can alternatively follow a standard credit/debit card number format and omit any identifier, but the routing information be for an institution that is restricted to transactions where funds are received.

This personal payment number (PPN) can therefore be revealed without any concern for fraudulent misuse since it can only be used to receive funds and therefore is of no benefit to any other party. Any misuse would only benefit the registered cardholder. In effect it represents an inverse debit/credit card, allowing payment directly into an account rather than from an account.

To incorporate this invention with an existing credit or debit card account, a payment account number could be linked to an existing credit/debit card account so users would have a combined account with two numbers: one for making payments (the actual credit/debit card number) and one for receiving payments (the PPN or personal payment number).

The payment number could be printed on the back of an existing credit/debit card allowing for use in face to face transactions or for easy access if used over the phone or Internet. The number could also be stored within a software package (such as virtual card software) for easy use on the Internet.

Since a PPN can not be used (or misused) for making purchases it can be freely disseminated in a way similar to the way to a public encryption key is freely disseminated to allow payments to be made by anyone who needs to pay a certain person. Examples include shareware authors who could include their PPN in their software registration documentation. In on-line auction situations, sellers could email their PPN to the purchaser to allow them to complete the purchase at a payment service of their choice.

Of particular interest is the fact that a PPN could be used in place of a credit card number in the existing commercial systems named above (e.g., Billpoint, PayPal, Payme, and eMoneyMail) where the recipient receives funds by a refund onto a conventional credit card without the concerns of revealing a credit card number to a third party and its subsequent storage on an Internet accessible server.

The PPN, if it has the numerical format and verification codes (such as the checksum and cvv2) of a normal credit card, it can be processed by normal credit card terminals/software. To avoid any possible confusion with existing credit cards, an alternative would be to use a different number of digits or other differentiator. This would prevent the possibility of anyone trying to use a PPN for making a payment rather than receiving a payment since merchants and others would recognize that the PPN did not represent a valid credit card format. A possible disadvantage of specific PPN number format is that potentially less of the existing credit card infrastructure could be used leading to increased up-front investment costs for implementation of the system.

BRIEF DESCRIPTION OF THE DRAWINGS

These and other advantages, features and aspects of the present invention shall now be described by way of exemplary embodiments to which the present invention is not limited with reference to a accompanying drawing figures in which:

FIG. 2 shows an exemplary personal payment number format implementing the present invention;

DETAILED DESCRIPTION OF PREFERRED EMBODIMENTS

In this specification the terms "credit card" and "credit/debit card" refers to credit cards (MasterCard®, Visa®, Diners Club®, etc.), charge cards (e.g., American Express®, some department store cards), debit cards such as usable at ATMs and many other locations or that are associated with a particular account, and hybrids thereof (e.g., extended payment American Express®, bank debit cards with the Visa® logo, etc.).

Various aspects of the invention may be embodied in a general purpose digital computer that is running a program or program segments originating from a computer readable or usable medium, such medium including but not limited to magnetic storage media (e.g., ROMs, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

Exemplary System Implementation

Figure 1:
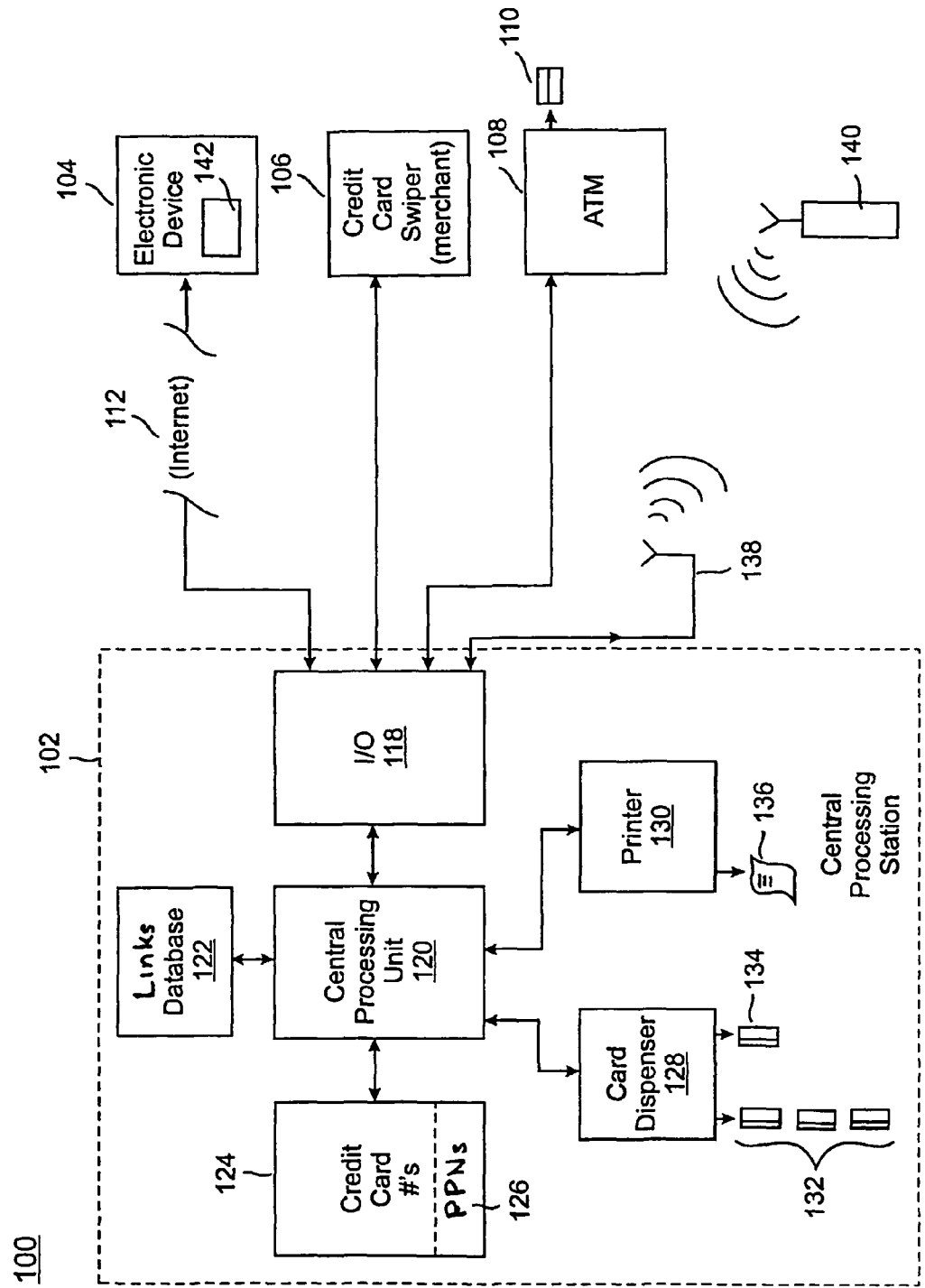
FIG. 1 shows an exemplary system for implementing the present invention.
Figure 3:
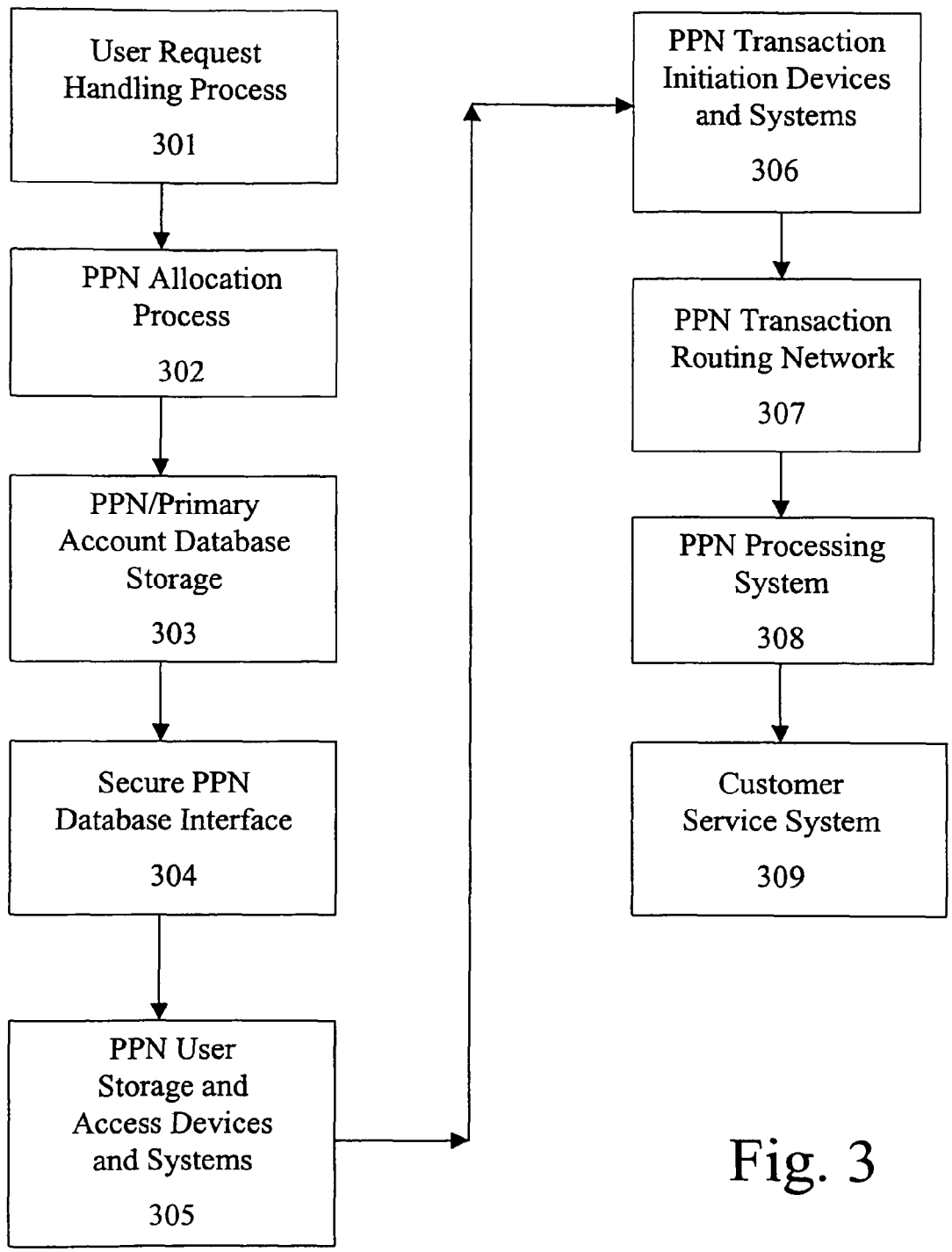
FIG. 3 shows, in high-level form, the operation of the central processing station shown in FIG. 1.

FIG. 1 shows an exemplary overview of a system for implementing the limited-use credit card system of the present invention. Further details of similar systems can be found in co-pending U.S. application Ser. No. 09/235,836 filed on Jan. 22, 1999 and 09/506,830 filed on Feb. 18, 2000, herein incorporated by reference. The system 100 comprises a central processing station 102, which, accordingly to exemplary embodiments, may be operated by the credit card provider.

Generally, this central processing station 102 receives and processes remotely generated credit card transactions. The credit card transactions can originate from a merchant in a conventional manner, e.g., by swiping a credit card through a card swipe unit 106. Alternatively, the credit card transaction requests can originate from any remote electronic device 104 (e.g., a personal computer). These remote devices 104 can interface with the central processing station 102 through any type of network, including any type of public or propriety networks, or some combination thereof. For instance, a personal computer 104 can interface with the central processing station 102 via the Internet 112. Actually, there may be one or more merchant computer devices (not shown) which receive credit card transactions from the remote electronic device 104, and then forward these requests to the central processing station 102. The central processing station 102 does not have to be in one geographic location. Instead, it can be embodied as a credit card transaction network which routes transaction information to specific card issuing institutions by, e.g., a bank identification number (BIN). Here it should be noted that a single bank can have several BINs, each of which would be considered an institution of purposes of this disclosure. The central processing station 102 can also interface with other types of remote devices, such as a wireless device 140 (e.g., cellular telephone), via radiocommunication using transmitting/receiving antenna 138.

The central processing station 102 itself may include a central processing unit 120, which interfaces with the remote units via network I/O unit 118. The central processing unit 120 has access to a database of credit card numbers 124, a subset 126 of which are designated as being available for use as personal payment numbers.

Also, the central processing unit 120 has access to a central database 122, referred to as a "links" database. This database is a general purpose database which stores information regarding customers' accounts, such as information regarding various links between each customer's PPN and his or her regular credit card account or other type of account using, for instance, some type of linked-list mechanism. Databases 122 and 124 are shown separately only to illustrate the type of information which may be maintained by the central processing station 102; the information in these databases can be commingled in a common database in a manner well understood by those having skill in the data processing arts. For instance, each PPN can be stored with a field which identifies a regular account to which it is linked, and various conditions regarding its use. It should be noted that no discernable relationship should exist between the PPN and the regular credit card number. Also, the different databases can be addressed using different BIN numbers or different number formats or other identifiers in the PPN number.

The central processing unit 120 can internally perform the approval and denial of transaction requests. For the PPN, if the transaction does not involve transferring funds into the PPN account, the transaction would be denied. For credit transactions, the approval or denial by making reference to credit history information and other information in the conventional manner. Alternatively, this function can be delegated to a separate clearance processing facility (not shown).

Finally, the central processing station includes the capability of transmitting the PPN to customers. In a first embodiment, a local card dispenser 128 can be employed to generate a plurality of PPN cards 132 and/or credit cards 134 additionally bearing a PPN for delivery to a customer. In another embodiment, the PPN can be printed on a form 136 by printer 130, which is then delivered to the customer via the mail. The PPN can be included in the initial letter distributing an associated credit card, or in a monthly or other periodic account statement sent to the customer. In yet another embodiment, the PPN can be electronically downloaded to a user's personal computer 104, where they are stored in local memory 142 of the personal computer 104 for subsequent use. In this case, the PPN can be encrypted, but concern over release of the PPN is much less than for regular credit card numbers. Instead of the personal computer 104, the numbers can be downloaded to a user's smart card though an appropriate interface. In a still further embodiment, the PPN can be downloaded to a radio unit 140 (such as a portable telephone) via wireless communication. In another embodiment, an ATM 108 can be used to dispense the PPN cards 110. Those skilled in the art will readily appreciate that other means for conveying the PPN numbers/cards can be employed. These embodiments are, of course, usable together.

The logic used to perform the PPN transactions preferably comprises a microprocessor which implements a stored program within the central processing unit 120. Any general or special purpose computer will suffice. In alternative embodiments, the logic used to perform the PPN transactions may comprise discrete logic components, or some combination of discrete logic components and computer-implemented control.

Personal Payment Number Format

Within the VISA and Mastercard systems, for instance, the first 6 digits of a credit card number represent a code (Bank Identification number or BIN) to identify both the issuing institution and are also used to define the associated charges (interchange fees) that are automatically made for each transaction. Other credit card systems use a similar procedure and card number format. A card issuing bank will typically have several BIN's, one for each different card products that attract different interchange rates. By allocating PPN's within a BIN that is used exclusively for PPN's, no payments can be made in that BIN. Therefore the interchange fees can be adjusted to make them appropriate for this sort of payment (ideally attracting zero or negative interchange).

This is in contrast refunding a conventional card account number leads to inverse interchange being charged to the card holder's bank as discussed above. In this situation, the card holder's bank is effectively subsidizing whichever merchant/acquirer handles the refund and has no effective means of control over this transaction and the associated costs. Although these distinctions make little difference to the holder of a PPN, they are of great relevance to the banks since they have a direct impact on the income from their credit card portfolio.

Figure 2:
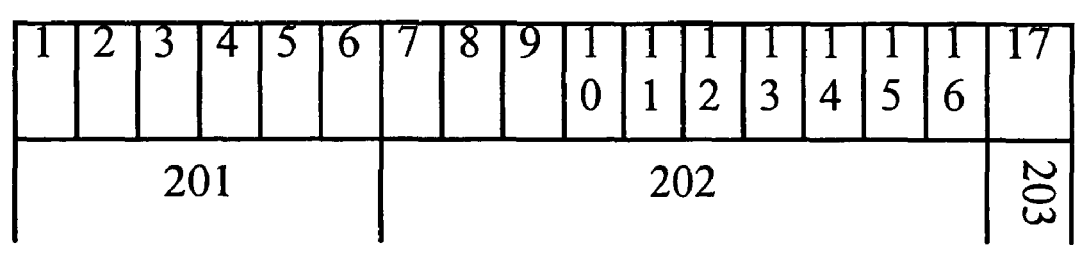

Thus, a personal payment number format includes routing information (e.g., BIN) 201 to direct financial transaction information to a particular institution among a plurality of institutions using a computer network, such as shown in the exemplary embodiment of FIG. 2. The PPN format also includes unique identification 202 of a user associated with the particular institution. The personal payment number identifies an account into which funds can be transferred but from which funds cannot be transferred.

This identification of the account as being a payment only account can take on several forms. For instance, the personal payment number format can include an identifier 203 identifying the personal payment number as an account into which funds can be transferred but not from which funds can be received. The position of this identifier 203 within the PPN format could be arbitrary or selected according to factors outside the scope of this invention. Alternatively, the identifier 203 can be omitted and the routing information 201 (e.g., BIN) can identify an address associated with accounts limited to receiving funds and not capable of transferring out funds.

The format of a PPN should ideally be of a format that is compatible with the existing credit/debit card numbering format which is usually 16 digits with a current maximum of 19 digits for the account number field within the industry standard transaction messaging protocols. The PPN should also have a valid checksum to ensure that it is transmitted without problems through existing networks which may include checksum validation. An expiry date should be provided and additional verification codes such as the cvv2 code if required to ensure compliance with existing networks.

A PPN specific coding format could be used to prevent confusion with existing credit cards but this would reduce the compatibility with the existing credit card systems requiring additional investment to implement the system. A compromise would be for the PPN to deviate from an existing format sufficiently to allow easy recognition that it is not a normal credit card number while still allowing transmission in the data fields of the transaction messaging systems that would normally hold the credit card number, for example for VISA cards 17 or 18 digits could be used to differentiate from the existing 16 digit credit card format, such as shown in FIG. 2.

In other words, the personal payment number can be formatted in accordance with standard credit/debit card formats. It can also be formatted to be distinct from standard credit/debit card formats, which might require some adjustment to the conventional credit transaction processing system. Alternatively, the personal payment number can be formatted to be unique among standard credit/debit card formats but remain within the acceptable standards for processing within the conventional credit transaction processing system. For instance, it can have an extra number which is acceptable to the credit transaction system, but not currently used by card issuing institutions. Also, the personal payment number format can include a verification code such as a checksum number and a cvv2.

The PPN Uses and Processes

A PPN can be used in a variety of ways. After a transaction is begun by accessing a web site or the like a PPN account holder can transmit the number (even by insecure means such as email) along with an electronic invoice requesting payment for goods/services provided. A PPN can also be included in the documentation or program code of a shareware or "try before you buy" software package. In this was the payee does not have to make any active step to receive funds, the person registering/purchasing the software simply uses the PPN to make the payment at an appropriate registration site. A PPN could also be displayed within a webpage.

In many current systems such as Billpoint the recipient receives an automated email from the payment system website when a payment is made. It is only when the recipient registers with the payment company that credit card or account details are given. Under these circumstances it possible that the email could be intercepted and someone other than intended recipient collects the funds. With a PPN payment, the payer can optionally verify the name linked to the PPN at a time of making a payment (Step 303) thus ensuring that the correct person is being credited. Alternatively banks could provide an authorized directory to allow payers to obtain a person's PPN, a form of PPN escrow.

Implementation Components

Implementation of the PPN solution includes a system and process comprising the following exemplary components:
   User Request Handling Process,
   PPN Allocation System,
   PPN/Primary Account Database Storage,
   Secure PPN Database Query Interface,
   PPN Distribution, User Storage and Access Device(s) and Systems,
   PPN Transaction Initiation Device(s) and Systems,
   PPN Transaction Routing Network,
   PPN Processing System, and
   Customer Service System.

These components are taken in turn for more detailed descriptions.

User Request Handling Process (Step 301)

Users can request a PPN from their bank or a bank can automatically allocate and distribute a PPN to all its account holders. During this process the bank logs details such as the account name, the PPN and the associated account in which funds are to be lodged. The options for the receiving account include a credit card account, a debit card account, freestanding bank account or other suitable account. It is important that the bank authenticates the user during this process to prevent people assuming the identity of others in order to receive funds fraudulently.

The request for a PPN can be received by the bank as an in-branch request, phone request, mail-in request, fax request or via an electronic network such as the Internet or digital TV. All these request avenues should feed into a single logging system to allow these requests to be processed appropriately.

An applicant can request a PPN account from a financial institution either in association with an existing credit/debit card/bank account, or as a standalone payment instrument (i.e. where the user's credit cards and bank accounts are held with another financial institution). In the former case the financial institution already has account information available as to where to forward the monies received, the user need only specify which account he/she wishes to use. In the case of a stand alone account the user must provide details of where the funds are to be transferred. The request can be handled by any normal route (in bank branch, by post, fax phone or by electronic network such as the Internet).

PPN Allocation System (Step 302)

The PPN allocation system handles requests for a PPN. During this allocation the system provides a valid PPN account number.

The allocation system ensures that there is no reversible numerical relationship between the PPN and an associated credit/debit card in order to ensure that the real credit/debit card number cannot be derived from the PPN. In addition the allocation system must check the availability of a PPN before issue to ensure that each issued PPN is unique. The leading digits of the PPN must be defined in order to route the PPN to the processing center appropriate for each issuing bank, in the existing credit card systems this is achieved with the use of BIN number (usually the leading 6 digits).

PPN/Primary Account Database Storage (Step 303)

Following the registration and allocation process, details of the allocated PPN and associated credit/debit card or other account details need to be logged in a database (122 and 124, FIG. 1) in order to support a variety of the other systems listed below such as the processing system, the PPN query system and customer service. The name of the account holder and other personal details may be held according to the policy of the PPN issuing bank. This system is secured from unauthorized external access since it contains sensitive financial services information. For maximum data integrity a single database could service all these different functions. Alternatively a number of interlinked databases could be used if the registration allocation system were geographically remote from the processing system or these functions were handled by different organizations. In the case of multiple databases additional controls would be used to reconcile information held across all the relevant databases.

Secure PPN Database Interface (Step 304)

An interface allows database queries, for example to request a PPN for a specific individual or to verify that a PPN belongs to a specific person. This function allows for the payer to ensure that the PPN belongs to the intended recipient and the number has not been altered or wrongly recorded at any point. The system could be used as a trusted source of PPN numbers as a form of PPN escrow. Alternatively for increased privacy a user could be required to enter the PPN and a name and be informed only if the match is correct or incorrect. A PPN holder may request for this service to be disabled if they wish for complete anonymity. This latter option will be provided only at the discretion of the issuing bank.

It is important to prevent unauthorized access to or alteration of credit/debit card or other personal details information of PPN holders held in the database. Therefore this database access system is highly secure and only allow specific types of requests by application of appropriate industry standard security and "firewall" technology. The database must however allow the bank and or the PPN holder (with appropriate authentication) to update information in the database if the PPN holder wishes to alter the status and stored attributes of the PPN account.

This database should also provide means for review of both PPN holders and the issuing bank of all transactions details. Access to this function can be via the customer service system or by the provision of a direct software connection to the database for example using software that the PPN holder obtains from his bank or using a standard browser interface.

PPN User Storage and Access Device(s) and System(s) (Step 305)

A range of PPN user storage and access devices can be used and the choice of the most appropriate format will depend on how the user intends to use the system. The user could simply be notified of the PPN number by letter or by the issuing a paper certificate, as explained above (136, FIG. 1). The PPN can be issued on its own physical plastic (or other suitable material) card (132, FIG. 1) that is marked so as to ensure that it cannot be mistakenly used for purchases. Such a card could carry a magnetic stripe containing the appropriate information to allow for payments to be made on a standard terminal. The PPN could be issued on a smart card carrying a chip containing the appropriate information/certificates to allow for payments to be made on a smart card enabled terminal. Alternatively it could be printed on the reverse of an existing card (134, FIG. 1). In this way a bank could issue a PPN to all its existing customers in a simple and cost effective way during card renewals.

The PPN can also be provided encoded in a software package that can be accessed by the user as required. The PPN could also be stored remotely by the issuing bank with the user accessing the number as required while connected to an electronic network (Internet, digital TV etc) using a browser or software designed for this express purpose (142, FIG. 1). Such access could use the above database access system. These systems could also provide for the automatic transfer of the PPN to a website or other recipient via email, or ATM or wireless set (108, 140, FIG. 1) as explained above.

PPN Transaction Initiation Device(s) and System(s) (Step 306)

Mechanisms are also required to initiate payments via a PPN. The account holder could register the PPN within a third party system electronic payment system such as PayPal, etc. and the system could then operate normally while providing extra security because the third party system electronic payment system does not hold actual bank or credit card details. In this scenario, payment would be made by whatever mechanism the system supports. Money would be transferred to the PPN as credit card refund. Such a refund could be handled by existing credit card terminals or transaction processing software if the PPN conformed to the standard credit card number format. When this transaction reaches the issuing bank it is remapped to transfer the funds either to the users own credit card account or directly to a bank account.

In addition banks could implement their own specific systems and devices for handling PPN payments. Such systems could add additional features such as PPN recipient verification, extraction of appropriate fees at source, allowing PPN holders and payers to check/review prior payments/receipts and provision of a digital receipt for the payer/recipient in the case of later disputes.

In the case of a PPN system using its own numerical format that deviated in some respects from standard credit formats, specifically modified transaction devices/software may be required to recognise and validate the PPN format before initiating the transaction.

PPN Transaction Routing Network (Step 307)

A PPN transaction once initiated would be transferred through the credit card networks typically involving transmission to a merchant acquiring bank and then onto the issuing bank either directly or via the existing card associations (e.g., VISA, Mastercard or Europay etc.) networks, collectively referred to and the central processing station 102 in FIG. 1. Inclusion of appropriate leading digits in the PPN will ensure that the existing global credit cards systems will automatically route the PPN transaction to the appropriate processing center as is the case with conventional refund transactions.

In the case of a PPN system using its own numerical format that deviated in some respects from standard credit formats, modifications to the existing systems may be required. Ideally from a commercial stand-point the PPN format should be capable of routing through the existing credit card networks even if it deviates from the standard format. Therefore in determining the appropriate number format for the PPN, the ability of the existing systems to transparently handle such a format is of key importance.

PPN Processing System (Step 308)

On receipt of a PPN transaction the processing system completes some or all of the following processes:
Validate that the received PPN is a valid and issued number,
Identify the appropriate associated customer account details,
Determine how funds are due to be forwarded for this customer and obtain required account numbers (e.g. credit/debit or bank account details),
Make appropriate deductions in the case where the bank is charging a commission or other service fee to customers for this service.

Create appropriate transaction messages incorporating the forwarding account details and the adjusted amount for the fund transfer to be completed by existing bank systems. Log transaction details in a database for auditing and customer service purposes, etc.

Forward the new or modified transaction messages onto the appropriate systems for completion. These systems may be the existing credit/debit card processing systems or direct electronic fund transfer systems.

In specific circumstances the processing system may be configured to hold/defer payments for a specific period or until additional confirmation is received that the transaction can proceed. This option may arise in the case of suspicious transactions, as a method for the bank to fund the system by gaining interest on the held funds or when payment is made contingent upon the delivery of specific goods and services.

When required the processing system should be able to initiate a reversal of a payment in order to correct for inaccurate or inappropriate payments.

Customer Service System (Step 309)

The customer service system provides the bank with a means to monitor activity and transactions with the PPN processing system. This will include assessing the state of the PPN processing system and initiating database queries for completed transactions. The need for this service arises from the need for monitoring by the bank and to handle customer queries regarding specific PPN transactions.

Integration with Existing Payment Services

For PPN systems using existing credit card formats, the system will be compatible with any system that currently provides for payment onto a credit/debit card.

Banks that issue PPN accounts could provide a specific payment portal/website that would operate for their own or any other banks PPN. This has the benefit that the payer can choose a site that he trusts on the basis of a well known name or potentially his/her own bank even if he/she does not have a PPN account. The recipient therefore does not have to dictate to the payer that the payment is made on a specific site (one that the payer may not previously have known). Such a site can provide enhanced PPN services. These services could include providing verification that a specific PPN was associated with the intended payee, email notification by the PPN holder of a payment and provision of a digital receipt signed by a certificate authority for use in case of a dispute. Payment from the payer can be initiated as a bank transfer or credit card payment or other suitable remote payment mechanism. The funds could then be transferred to the PPN by initiating a credit card refund transaction using the PPN and existing credit transaction handling hardware or software. This site can, under terms agreed with both parties, extract commission for the transaction from either the vendor or the purchaser. This would most commonly happen in association with online auction sites. To extract commission from the purchaser, the transaction website adds a specified amount or percentage to the transaction. To extract commission from the vendor a specific amount is deducted from the transaction prior to completing the transfer of funds to the payment number's account.

Transaction Cycle

Once the payment site receives the PPN, a standard type credit card refund transaction message is created, typically for refunds within a settlement message file, containing the PPN, transaction amount and other required information. The credit card networks will route the information contained within the transaction messages according to the leading digits of the payment number in the same manner as an existing credit card transaction. This will be routed on the basis of a specific BIN (i.e. Bank Identification Number such as the first six digits in a VISA format number) to a dedicated processing server which will verify the validity of the payment number and use a database to identify the appropriate receiving account.

With a credit card format compatible PPN, funds transfer will be handled by the existing settlement systems with funds being transferred to the PPN issuing bank from the card scheme and recovered by the scheme from the merchant acquirer bank and from there from the originating payment site which acts as a credit card merchant. In the case that the acquiring bank and issuing bank are the same institution or have a bilateral agreement then the funds transfer may be made without reference to the card scheme networks.

Implementation of Location of System Components

In terms of location of the system, it could be implemented within a bank's internal credit card processing system. If a dedicated BIN (i.e. 6 digit header in VISA and Mastercard systems) is used then the credit card networks will direct all transactions to the required processing site. The software receiving the transaction information would validate the PPN number, determine the matching account details and then use standard existing networks to effect the payment.

The service could also be offered on a bureau basis whereby the PPN transactions of wide range of banks would be directed to a single site operated on behalf of all the banks. Provided this site had access to the account details of each PPN holder and access to the banking/credit card payment systems, such a single site could operate such a service for many banks. This service could allow banks to handle their own PPN allocation and then inform the central service of the number. Alternatively the entire process could be centralized with the bureau service hosting the allocation system. In this option, banks would when handling a request for a PPN request a PPN from the central system and provide the other required account details at the same time.

Such a bureau solution could be operated by the card scheme themselves providing a global service from a single site. In this situation the central site could provide for remapping the received PPN to the matching credit/debit card and forward the transaction/settlement messages onto the appropriate institutions for completion of the transaction. The interchange fees contained within the settlement messages would inherited from the original message to maintain the PPN specific interchange fees rather than the interchange associated with the receiving account. In this scenario the banks would receive standard refund transactions on a credit/debit card number and can process these entirely as normal without the financial costs associated with reverse interchange. Alternatively the central system could also provide for direct transfer of funds to a users bank account without the need for further use of the credit card systems, instead linking directly into the electronic funds transfer systems.

Alternative Implementation

In the above description the transaction website (effectively a web merchant) initiates the purchasing transaction on behalf of the payer and transmits the required information for the payment transaction for processing by the payment card processing software center. In this scenario the payment from the payer and the payment to the recipient are separate transactions.

An alternative is for both the PPN and the purchasing credit card number to be transmitted within appropriate fields within the financial message that is transmitted back for processing, with the PPN being used as the primary account number to ensure appropriate routing of the transaction message. In this scenario the payment and receipt of funds are linked and conducted by a party within the banking/credit card system rather than at the merchant level. This has the advantage that the payers details can be logged along with the PPN transaction to allow for easier transaction audit. Under these circumstances the required processing for both making and receiving the payment could be initiated at several levels, either at the level of a credit card merchant acquirer bank, within the card scheme systems or following routing from a merchant acquirer to a card processing system. Within these systems the purchasing and payment transaction can then be executed either within the same system (i.e., merchant acquirer or by processing system) or be divided between the two systems. Completion of the transaction will require one of these two systems to initiate a standard credit transaction effectively acting as a merchant and receive payment on behalf of the purchaser or to receive funds from the payer using an alternative payment system. An appropriate fund transfer (or credit to a credit card account) is then made to the payee. Pre-agreed commissions can be added to the purchase amount or deducted from payment amount in the course of the transaction. A negotiated commission can be paid to the website/merchant that initiated the transaction and transmitted the information into the credit card networks. This can be done in an independent settlement process or by direct bank transfer since the merchant is identified within the financial message format as described above.

The PPN has a number of highly positive features such as:

(1) PPN can be used in situations where revealing a credit card number would be considered potentially risky.

(2) The interchange fees associated with normal transactions can be modified to be appropriate for receiving payment rather than making payment. This allows for person to person payments without impacting on the processing of true refunds.

(3) The existing global credit card networks can be used to handle the payment providing a trusted established system.

(4) Currency exchange is handled automatically by the card networks.

(5) In order to receive payment, the PPN holder does not need to reveal bank account or credit/debit card details to anyone other than his own bank or credit card company.

It will be appreciated that the present invention is not limited to the foregoing exemplary embodiments. Variations and modifications will occur to those skilled in the art without departing from the scope of the present invention as described in the claims appended hereto.

The invention claimed is:

1. A computer processing device comprising:
a computer-readable recording medium having data recorded thereon for facilitating a financial transaction originating from a payer in a computer network, the data recorded on the computer-readable recording medium including a data structure for access by said payer to initiate a financial transaction originating from the payer, said data structure including a personal payment number format comprising:
routing information to direct financial transaction information to a particular institution among a plurality of institutions using the computer network, and
a unique identification of a payee associated with said particular institution, wherein said personal payment number identifies an account into which funds can be transferred but from which funds cannot be transferred; and
a processor configured to execute computer-readable instructions to cause a communication module to communicate said personal payment number to the payer to initiate the financial transaction originating from the payer.

2. The computer processing device according to claim 1, wherein said personal payment number format further comprises an identifier identifying said personal payment number as an account into which funds can be transferred but from which funds cannot be received.

3. The computer processing device according to claim 1, wherein said routing information identifies an address associated with accounts limited to receiving funds and not capable of transferring out funds therefrom.

4. The computer processing device according to claim 1, wherein said routing information includes a bank identification number (BIN).

5. The computer processing device according to claim 1, wherein said personal payment number is formatted in accordance with standard credit/debit card formats.

6. The computer processing device according to claim 1, wherein said personal payment number is formatted to be distinct from standard credit/debit card formats.

7. The computer processing device according to claim 1, wherein said personal payment number is formatted to be unique among standard credit/debit card formats.

8. The computer processing device according to claim 1, wherein said format further comprises a verification code.

9. The computer processing device according to claim 8, wherein said verification code is selected from a group consisting of a checksum number and a cvv2.

10. A personal payment number processing system comprising:
means for allocating personal payment numbers to payees, each personal payment number including routing information and information identifying a payee, wherein said personal payment number identifies an account associated with a payee into which funds can be transferred but from which funds cannot be transferred;
means for initiating a personal payment number transaction originating from a payer utilizing an allocated personal payment number;
means for routing said personal payment transaction to a destination based on the routing information included in the allocated personal payment number; and
means for processing said personal payment number transaction to enable transfer of funds into the account identified in the allocated personal payment number.

11. The personal payment number processing system according to claim 10, further comprising:
means for handling a request for a personal payment number; and
means for distributing personal payment numbers.

12. The personal payment number processing system according to claim 10, further comprising means for interfacing with a secure personal payment number database to allow queries about transactions.

13. The personal payment number processing system according to claim 10, further comprising means for storing personal payment numbers and associated credit/debit accounts as linked accounts.

14. The personal payment number processing system according to claim 10, wherein said allocation means includes means for ensuring that there is no reversible numerical relationship between the personal payment number and an associated credit/debit account.

15. The personal payment number processing system according to claim 10, wherein said means for processing said personal payment number transaction further includes:

means for validating that a received personal payment number is a valid and issued number, and means for identifying appropriate associated payee account details.

16. The personal payment number processing system according to claim 10, wherein said means for processing said personal payment number transaction further includes:
   means for determining how funds are due to be forwarded for a payee and for obtaining required account numbers;
   means for creating appropriate transaction messages incorporating the determined and obtained account numbers to be forwarded and an adjusted amount for a fund transfer to be completed by existing bank systems; and
   means for forwarding the transaction messages onto an existing bank system for completion.

17. The personal payment number processing system according to claim 10, wherein said means for processing includes means for determining an account number based on said identifying information.

18. A personal payment number processing method comprising:
   allocating, in a computer processing device, personal payment numbers to payees, each personal payment number including routing information and information identifying a payee, wherein said personal payment number identifying an account associated with a payee into which funds can be transferred but from which funds cannot be transferred;
   receiving, in the computer processing device, initiation of a personal payment number transaction originating from a payer utilizing an allocated personal payment number;
   routing, from the computer processing device, said received personal payment transaction to a destination based on the routing information included in the allocated personal payment number; and
   processing said personal payment number transaction to enable transfer of funds into the account identified in the allocated personal payment number.

19. The personal payment number processing method according to claim 18, further comprising:
   handling request for a personal payment number; and
   distributing personal payment numbers.

20. The personal payment number processing method according to claim 18, further comprising storing personal payment numbers and associated credit/debit accounts as linked accounts.

21. The personal payment number processing method according to claim 18, wherein said step of processing said personal payment number transaction further includes:
   validating that a received personal payment number is a valid and issued number, and
   identifying appropriate associated payee account numbers.

22. The personal payment number processing method according to claim 18, wherein said processing includes determining an account number based on said identifying information.

23. A computer processing device comprising:
   a computer-readable recording medium having recorded thereon a database configured to store
      a data structure for facilitating financial transactions in a computer network, the recorded data structure including a plurality of personal payment numbers, each personal payment number including routing information to direct financial transaction information to a particular institution among a plurality of institutions using said computer network, and a unique identifier of a payee, and
   account numbers each being respectively associated with payee and logically linked in said database with a respective one of unique identifiers of said personal payment number; wherein each of said personal payment numbers permitting credit transactions but not permitting debit transactions involving the account respectively associated with a personal payment number transaction; and
   a processor configured to execute computer-readable instructions to cause a communication module to enable a payer originating a personal payment transaction to access the stored information of personal payment numbers but not permitting access to an account number of an account respectively linked to the personal payment number.

24. A method of implementing a personal payment number transaction comprising:
   communicating, from a computer processing device, a personal payment number to a payer, said personal payment number having a format comprising:
      routing information to direct financial transaction information to a particular institution among a plurality of institutions using a computer network, and a unique identification of a payee associated with said particular institution, wherein said personal payment number identifies an account into which funds can be transferred but from which funds cannot be transferred; and
      facilitating transfer of funds in the account via a personal payment number transaction, said transfer being initiated by the payer.

25. The method of claim 24, wherein the personal payment number is communicated by way of an invoice requesting payment of goods or services provided.

26. The method of claim 24, wherein the personal payment number is communicated by way of displaying the number within a webpage.

27. The method of claim 24, wherein the personal payment number is communicated by way of email.

28. The method of claim 24, wherein the personal payment number is communicated to the payer by way of the payer accessing a database including a directory of personal payment numbers.

29. The method of claim 24, wherein the personal payment number is communicated by way of documentation or program code of a software package.

30. The method of claim 24, wherein the personal payment number is communicated by way of an automated transaction machine (ATM).

31. The method of claim 24, wherein the personal payment number is communicated to the payer by way of bearing indicia of the personal payment number on a financial transaction card.

32. The method of claim 24, wherein the personal payment number is communicated to the payer by way of printing the personal payment number onto an existing financial transaction card of the payer.

* * * * *